US007007463B2

(12) United States Patent
Shirakawa

(10) Patent No.: US 7,007,463 B2
(45) Date of Patent: Mar. 7, 2006

(54) ENGINE FUEL INJECTION CONTROL SYSTEM

(75) Inventor: Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 81 days.

(21) Appl. No.: 10/886,660

(22) Filed: Jul. 9, 2004

(65) Prior Publication Data

US 2005/0022512 A1 Feb. 3, 2005

(30) Foreign Application Priority Data

Jul. 31, 2003 (JP) ............................ 2003-284234

(51) Int. Cl.
*F01N 3/00* (2006.01)

(52) U.S. Cl. ............................ 60/297; 60/274; 60/278; 60/285; 60/295; 60/311

(58) Field of Classification Search .................. 60/274, 60/278, 280, 285, 286, 295, 297, 301, 311
See application file for complete search history.

(56) References Cited

U.S. PATENT DOCUMENTS 5,716,586 A * 2/1998 Taniguchi ................... 422/173
6,672,989 B1 * 1/2004 Murata et al. ................ 477/97
6,698,192 B1 * 3/2004 Ootake ........................ 60/297
6,851,258 B1 * 2/2005 Kawashima et al. .......... 60/311
6,901,751 B1 * 6/2005 Bunting et al. ............... 60/297
6,952,920 B1 * 10/2005 Shirakawa .................. 60/311

FOREIGN PATENT DOCUMENTS

JP 7-26935 A 1/1995

* cited by examiner

*Primary Examiner*—Binh Q. Tran
(74) *Attorney, Agent, or Firm*—Shinjyu Global IP Counselors, LLP

(57) ABSTRACT

An engine fuel injection control system including a particulate filter is configured to compare an accelerator request fuel injection quantity based on an accelerator depression amount to an air fuel ratio request fuel injection quantity determined based on a target air fuel ratio based on the engine operating condition. The engine fuel injection control system is configured to select the smaller of the accelerator request fuel injection quantity and the air fuel ratio request fuel injection quantity as a target fuel injection quantity. When the engine is operating in a low rotational speed region with full load, the target air fuel ratio is adjusted to a value substantially equal to the air fuel ratio that provides a maximum torque. Thus, the fuel is injected to achieve an air fuel ratio close to the stoichiometric air fuel ratio the torque performance and acceleration performance can be improved.

15 Claims, 7 Drawing Sheets

ENGINE FUEL INJECTION CONTROL SYSTEM

BACKGROUND OF THE INVENTION

1 Field of the Invention

The present invention generally relates to an engine fuel injection control system. More specifically, the present invention relates to a diesel engine fuel injection control system that controls fuel injection quantity of a diesel engine.

2 Background Information

Japanese Laid-Open Patent Publication No. 7-26935 discloses a diesel engine having a fuel injection pump configured to deliver fuel to the engine and a particulate filter provided in an exhaust passage. The engine is controlled such that the maximum injection quantity from the fuel injection pump is corrected to a smaller quantity in accordance with the amount of particulate matter accumulated in the particulate filter. Thus, the amount of particulate matter discharged from the engine is reduced when the amount of particulate matter accumulated in the filter is relatively large. Accordingly, a rapid increase in the amount of particulate matter accumulated in the filter is suppressed and an increase in the exhaust gas resistance is also suppressed.

In view of the above, it will be apparent to those skilled in the art from this disclosure that there exists a need for an improved diesel engine fuel injection control system. This invention addresses this need in the art as well as other needs, which will become apparent to those skilled in the art from this disclosure.

SUMMARY OF THE INVENTION

It has been discovered that in the diesel engine disclosed in the above mentioned reference, the maximum fuel injection quantity of the fuel injection pump is reduced or revised in accordance with the particulate matter accumulation amount to prevent the particulate matter from being discharged. Consequently, when the fuel injection quantity is corrected, the torque performance and acceleration performance of the diesel engine is relatively poor in comparison with gasoline engines.

Therefore, one object of the present invention to provide a diesel engine fuel injection control system that provides an improved torque performance and acceleration performance when the engine is operating at a low rotational speed with a full load.

In order to achieve the above mentioned and other objects of the present invention, an engine fuel injection control system is provided that comprises an operating condition detecting section, a particulate filter, a fuel injection quantity determining section, and a target air fuel ratio adjusting section. The operating condition detecting section is configured and arranged to detect an operating condition of an engine. The particulate filter is configured and arranged in an exhaust passage of the engine to accumulate exhaust particulate matter discharged from the engine. The fuel injection quantity determining section is configured and arranged to compare an accelerator request fuel quantity corresponding to an accelerator depression amount with an air fuel ratio request fuel injection quantity determined based on a target air fuel ratio corresponding to the engine operating condition. Also, the fuel injection quantity determining section is configured and arranged to select a smaller one of the accelerator request fuel quantity and the air fuel ratio request fuel injection quantity as a target fuel injection quantity. The target air fuel ratio adjusting section is configured and arranged to adjust the target air fuel ratio to a value substantially equal to an air fuel ratio that provides a maximum torque when the operating condition detecting section detects the engine is operating in a low rotational speed with a full-load condition.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
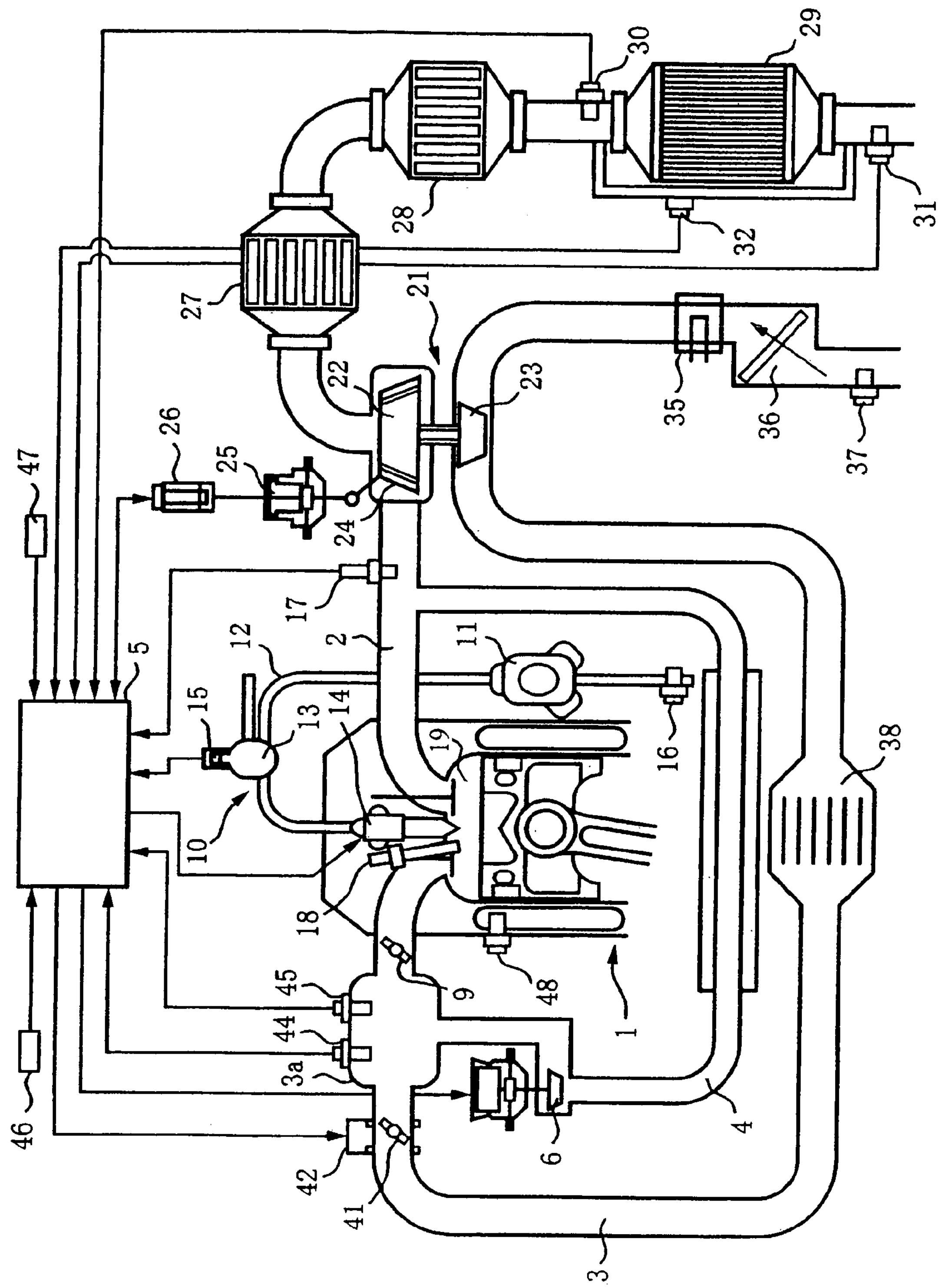
FIG. 1 is a schematic illustration of a diesel engine equipped with a diesel engine fuel injection control system in accordance with one embodiment of the present invention.

Referring initially to FIG. 1, an engine fuel injection control system or apparatus is illustrated for an internal combustion engine such as a turbocharged diesel engine 1 in accordance with a first embodiment of the present invention. The diesel engine 1 is preferably a so-called low compression ratio engine having a compression ratio of approximately 14 and is configured to perform low-temperature premixed combustion in order to reduce NOx emissions. The diesel engine fuel injection control system in accordance with the present invention can be applied to other internal combustion engines used in automobiles and the like. The engine 1 preferably performs a comparatively large quantity of exhaust gas recirculation (EGR). With the diesel engine fuel injection control system according to the present invention, when the engine 1 is operating at a low rotational speed with a full load, the fuel can be injected such that an air fuel ratio close to the stoichiometric air fuel ratio is achieved. Therefore, with the diesel engine fuel injection control system of the present invention, the torque performance and acceleration performance can be improved when the engine 1 is operating with a full load in a low rotational speed region.

As seen in FIG. 1, the engine 1 has an exhaust passage 2 and an intake passage 3 with a collector 3*a*. An EGR passage 4 links the exhaust passage 2 to the collector 3*a* of the air intake passage 3. The operation of the engine 1 is controlled by an engine control unit 5. More specifically, the control unit 5 preferably includes a microcomputer with a control program that controls the engine 1 as discussed below. The control unit 5 can also include other conventional components such as an input interface circuit, an output interface circuit, and storage devices such as a ROM (Read Only Memory) device and a RAM (Random Access Memory) device. The microcomputer of the control unit 5 is programmed to control the various components of the engine 1. The memory circuit stores processing results and control programs that are run by the processor circuit. The control unit 5 is operatively coupled to the various components of the engine 1 in a conventional manner. The internal RAM of the control unit 5 stores statuses of operational flags and various control data. The control unit 5 is capable of selectively controlling any of the components of the control system in accordance with the control program. It will be apparent to those skilled in the art from this disclosure that the precise structure and algorithms for the control unit 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

An EGR valve 6 is disposed in the EGR passage 4 and is operatively connected to the engine control unit 5. Preferably, the valve opening degree of the EGR valve 6 can be continuously and variably controlled by a stepping motor or any other device that can continuously and variably control the valve opening degree of the EGR valve 6. The valve opening degree of the EGR valve 6 is controlled by the engine control unit 5 to obtain a specified EGR rate in response to the operating conditions received by the engine control unit 5 from various operating condition sensors. In other words, the valve opening degree of the EGR valve 6 is variably controlled so as to variably control the EGR rate towards a target EGR rate set by the engine control unit 5. For example, the EGR rate is set to a large EGR rate when the engine 1 is operating in a low-speed, low-load region, and as the engine speed and load becomes higher, the EGR rate becomes lower.

A swirl control valve 9 is provided in the intake passage 3 in the vicinity of an air intake port of the engine 1. The swirl control valve 9 is configured and arranged to produce a swirling flow inside the combustion chamber 19 depending on the operating conditions of the engine 1. The swirl control valve 9 is driven by an actuator (not shown) and opened and closed in response to a control signal from the control unit 5. For example, the swirl control valve 9 is preferably closed in a low load and low speed condition to produce a swirling flow inside the combustion chamber 19.

The engine 1 is also preferably equipped with a common rail fuel injection device 10. In this common rail fuel injection device 10, after fuel is pressurized by a high pressure fuel pump 11, the fuel is fed through a high-pressure fuel supply passageway 12 such that the fuel accumulates in an accumulator 13 (common rail). The fuel is then distributed from this accumulator 13 to a plurality of fuel injection nozzles 14 for each of the engine cylinders. The control unit 5 is configured to control the opening and closing of the nozzles of each of the fuel injection nozzles 14 to inject fuel into the engine cylinders. The fuel pressure inside the accumulator 13 is variably adjusted by a pressure regulator (not shown) and a fuel pressure sensor 15 is provided in the accumulator 13 for detecting the fuel pressure. The fuel pressure sensor 15 is configured and arranged to output to the control unit 5 a fuel pressure signal that is indicative of the fuel pressure in the accumulator 13.

A fuel temperature sensor 16 is arranged upstream of the fuel pump 11. The fuel temperature sensor 16 is configured and arranged to detect the fuel temperature and output to the control unit 5 a signal that is indicative of the fuel temperature. In addition, a conventional glow plug 18 is arranged in the combustion chamber 19 of each of the engine cylinders to ignite the fuel in each combustion chamber 19.

The engine 1 has a variable-capacity turbo supercharger 21 equipped with a coaxially arranged exhaust turbine 22 and a compressor 23. For example, a variable geometric turbocharger having a variable geometric valve system can be used as the variable-capacity turbo charger 21. Of course, it will be apparent to those skilled in the art from this disclosure that the variable-capacity turbo supercharger 21 is not limited to the variable geometric turbocharger. Rather, any type of turbo supercharger in which a capacity of the turbo supercharger is effectively varied by controlling a capacity adjusting device or devices can be utilized as the variable-capacity turbo supercharger 21 in the present invention. The exhaust turbine 22 is positioned in the exhaust passage 2 at a position downstream of a portion where the EGR passage 4 connects to the exhaust passage 2. In order to vary a capacity of the turbo supercharger 21, the turbo supercharger 21 is preferably provided with a variable nozzle 24 or a capacity adjusting device arranged at a scroll inlet of the exhaust turbine 22. In other words, a capacity of the turbo supercharger 21 can be varied depending on the engine operating conditions. For example, a relatively small capacity of the turbo supercharger 21 is preferably achieved by reducing an opening degree of the variable nozzle 24 when the exhaust gas flow rate is relatively small (such as a low speed region). On the other hand, a relatively large capacity is preferably achieved by increasing the opening degree of the variable nozzle 24 when the exhaust gas flow rate is relatively large (such as a high speed region). The variable nozzle 24 is preferably driven by a diaphragm actuator 25 configured to respond to a control pressure (negative control pressure), and the control pressure is generated using a duty-controlled pressure control valve 26.

A wide-range air fuel ratio sensor 17 is provided on the upstream side of the exhaust turbine 22. The air-fuel ratio sensor 17 is configured and arranged to detect the air fuel ratio of the exhaust gas. Thus, the air-fuel ratio sensor 17 is further configured and arranged to output to the control unit 5 a signal that is indicative of the exhaust air-fuel ratio.

The exhaust system of the engine 1 includes an oxidation catalytic converter 27 disposed in the exhaust passage 2 on the downstream side of the exhaust turbine 22. The oxidation catalytic converter 27 has an oxidation catalyst that oxidizes, for example, CO and HC contained in the exhaust gas. The exhaust system of the engine 1 also includes a NOx trapping catalytic converter 28 that is configured to treat NOx in the exhaust passage 2 on the downstream side of the oxidation catalytic converter 27. Thus, the oxidation catalytic converter 27 and the NOx trapping catalytic converter 28 are arranged in sequence in the exhaust passage 2 downstream of the exhaust gas turbine 22. This NOx trapping catalytic converter 28 is configured and arranged to adsorb NOx when the exhaust air-fuel ratio of the exhaust flowing into the NOx trapping catalytic converter 28 is lean. Thus, the oxygen density of the exhaust flowing into the NOx trapping catalytic converter 28 drops. When an oxygen concentration of the exhaust gas decreases, the NOx trapping catalytic converter 28 releases the adsorbed NOx and cleans the exhaust gas by catalytic action so as to perform a purification process.

The exhaust system of the engine 1 also includes an exhaust gas after-treatment system such as a particulate filter 29 (diesel particulate filter: DPF) that is equipped with a catalyst for collecting and removing exhaust particulate matter (particulate matter or "PM"). The particulate filter 29 is provided on the downstream side of the NOx trapping catalytic converter 28. The particulate filter 29 is constructed, for example, with a wall flow honeycomb structure (alternate cannel end blocked type) having a filter material such as cordierite with a plurality of honeycomb-shaped, fine passages formed therein and the alternate ends of the passages are closed.

The exhaust system of the engine 1 also includes a filter inlet temperature sensor 30 and a filter outlet temperature sensor 31 that are provided on the inlet side and outlet side of the particulate collection filter 29, respectively. The temperature sensors 30 and 31 are configured and arranged to detect the exhaust temperature at the inlet side and outlet side, respectively. Thus, the temperature sensors 30 and 31 are further configured and arranged to output to the control unit 5 a signal that is indicative of the exhaust temperature at the inlet side and outlet side, respectively.

Since a pressure loss of the particulate filter 29 changes as the exhaust particulate matter accumulates, a pressure difference sensor 32 is provided to detect the pressure difference between the inlet and outlet of the particulate collection filter 29. Of course, it will be apparent to those skilled in the art from this disclosure that, instead of using the pressure difference sensor 32 to detect the pressure difference directly, separate pressure sensors can be provided at the inlet and the outlet of the particulate filter 29 to find the pressure difference based on the two pressure values. A muffler (not shown) is also preferably disposed downstream of the particulate collection filter 29.

The intake air system of the engine 1 preferably includes an airflow meter 35 that is configured and arranged to detect a fresh intake air quantity passing through the air intake passage 3. The airflow meter 35 is provided on the upstream side of the compressor 23 in the air intake passage 3. The airflow meter 35 is configured and arranged to output to the control unit 5 a signal that is indicative of the fresh intake air quantity passing through the air intake passage 3.

The intake air system of the engine 1 preferably includes an air filter 36 and an atmospheric pressure sensor 37 that are positioned on the upstream side of the airflow meter 35. The atmospheric pressure sensor 37 configured and arranged to detect outside pressure, i.e., atmospheric pressure. The atmospheric pressure sensor 37 is provided at the inlet of the air filter 36. The atmospheric pressure sensor 37 is configured and arranged to output to the control unit 5 a signal that is indicative of the outside air pressure entering the air intake passage 3.

The intake air system of the engine 1 preferably includes an intercooler 38 to cool the high-temperature supercharged air. The intercooler 38 is disposed in the air intake passage 3 between the compressor 23 and a collector 3*a*.

In addition, the intake air system of the engine 1 preferably includes an intake air throttle valve 41 that is configured to restrict the fresh intake air quantity. The intake air throttle valve 41 is installed in the air intake passage 3 on the inlet side of the collector 3*a* of the air intake passage 3. The opening and closing of this intake air throttle valve 41 is driven by control signals of the engine control unit 5 through an actuator 42 that preferably includes a stepper motor or the like. Further, a supercharging pressure sensor 44 that detects supercharging pressure and an intake temperature sensor 45 that detects intake air temperature are provided in the collector 3*a*.

The control unit 5 is configured and arranged to control a fuel injection quantity and a fuel injection timing of the fuel injection device 10, the opening degree of the EGR valve 6, the opening degree of the variable nozzle 24, and other components and functions of the engine 1. Moreover, in addition to the various sensors installed in the engine 1 as mentioned above, the control unit 5 is configured and arranged to receive detection signals from an accelerator position sensor 46 for detecting a depression amount of the accelerator pedal, an engine rotational speed sensor 47 for detecting the rotational speed of the engine, and a temperature sensor 48 for detecting the temperature of the engine coolant.

Figure 2:
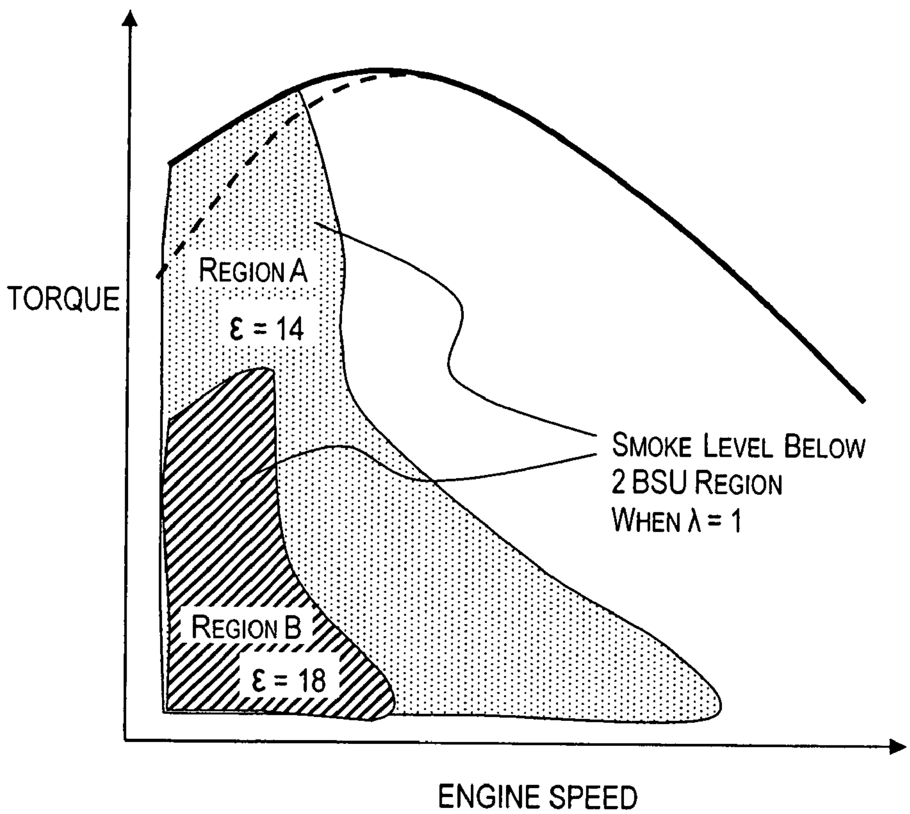
FIG. 2 is a diagram illustrating a smoke generation state as determined based on an engine operating condition and a compression ratio.

Since the engine 1 is preferably a low compression ratio engine, a combustion temperature is relatively low. As shown in FIG. 2, a low-compression ratio engine such as the engine 1 discharges almost no smoke from a combustion chamber (cylinder) when the engine is operating at a low rotational speed with a full load, even if the air fuel ratio is lowered to a value close to the stoichiometric air fuel ratio. Moreover, comparing to conventional diesel engines that have a high compression ratio ($\epsilon$=approximately 18) (region B), the engine 1 (which has a low compression ratio) has a much larger region (region A) in which the engine 1 can operate while discharging almost no smoke from the combustion chamber 19 (cylinder) when the stoichiometric air fuel ratio is used as seen in FIG. 2. In FIG. 2, BSU is a unit indicating a concentration of black smoke discharged. More specifically, a value of 2 BSU or less indicates a degree of black smoke that can be observed visually. Since a maximum torque can be obtained by using the stoichiometric air fuel ratio, a maximum torque (shown in a solid line in FIG. 2) obtained in the low-compression ratio engine such as the engine 1 becomes higher than a maximum torque (shown in a broken line in FIG. 2) in the high-compression ratio in a region with a low-rotational speed and a full load. As used herein, a low rotational speed of the engine 1 is defined as a rotational speed that is lower than a threshold rotational speed with which a maximum torque corresponding to the stoichiometric air fuel ratio is obtained without substantially discharging smoke (e.g., the smoke discharged is less than 2BSU). For example, when the compression ratio is approximately 14, the threshold rotational speed is approximately 1600 rpm. Of course, it will be apparent to those skilled in the art from this disclosure that the actual value of the threshold rotational speed will change depending on the compression ratio of an engine and various other design parameters of the engine, and thus, the threshold rotational speed is determined on an experimental basis.

Thus, in the diesel engine fuel injection control system of the present invention, when the engine 1 is operating at a low rotational speed and is put into a full load operating condition due to, for example, a rapid acceleration, a target air fuel ratio of the engine 1 is set to a rapid acceleration air fuel ratio with which a maximum torque can be obtained, i.e., a value close to the stoichiometric air fuel ratio. Then, the fuel is injected from the fuel injection nozzle 14 such that an air fuel ratio equal to the target air fuel ratio is obtained. Moreover, the diesel engine fuel injection control system of the present invention is configured to estimate a particulate matter accumulation amount in the particulate filter 29, and the rapid acceleration air fuel ratio is outputted for a prescribed period of time determined based on the particulate matter accumulation amount in the particulate filter 29. Thus, an excessive accumulation of the particulate matter in the particulate filter 29 is prevented.

Figure 3:
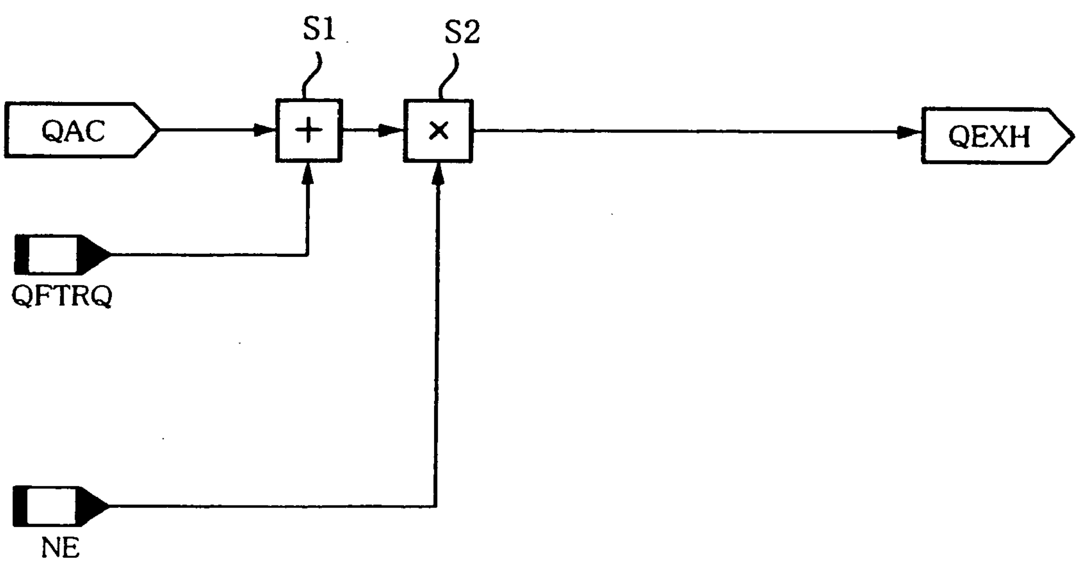
FIG. 3 is a functional block diagram illustrating a control processing executed in the diesel engine fuel injection control system in order to determine an exhaust gas flow rate in accordance with the one embodiment of the present invention.
Figure 4:
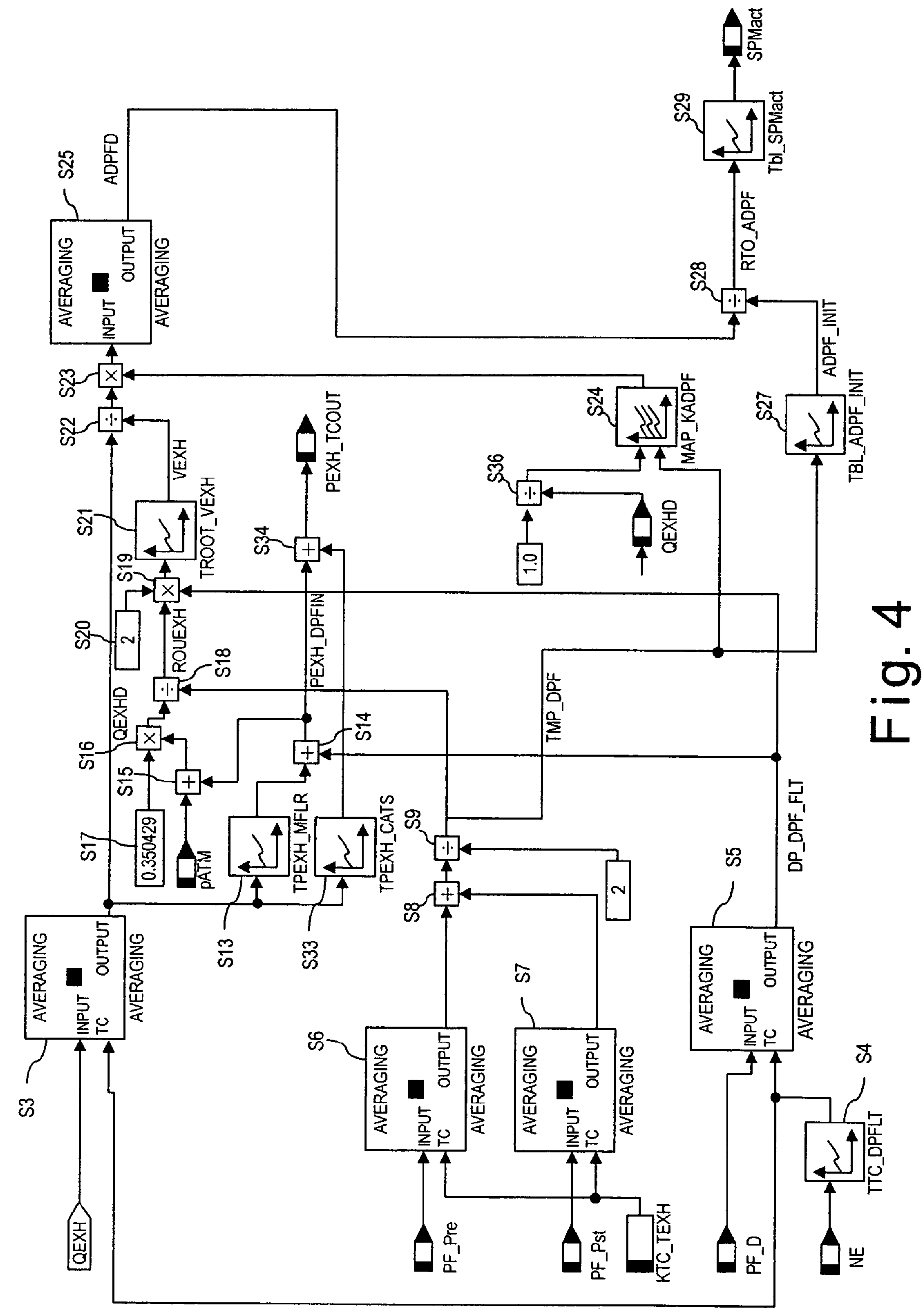
FIG. 4 is a functional block diagram illustrating a control processing executed in the diesel engine fuel injection control system in order to determine a particulate matter accumulation amount in a particulate filter in accordance with the one embodiment of the present invention.

Referring now to FIGS. 3 and 4, the control operations executed by the control unit 5 in order to estimate the particulate matter accumulation amount in the particulate filter 29 will now be described. Many of the functions described below are functions that can be executed using software processing.

Basically, in the diesel engine fuel injection control system of the present invention, the particulate matter accumulation amount corresponding to an amount of the particulate matter accumulated in the particulate filter 29 is estimated by first calculating a passage surface area (an equivalent surface area) of the particulate filter 29 based on the Bernoulli theorem. Then, the calculated passage surface area is compared with a surface area corresponding to a case in which the accumulation amount of the exhaust particulate matter in the particulate filter 29 is zero to determine a surface area reduction ratio. Finally, the particulate matter accumulation amount in the particulate filter 29 is calculated based on the surface area reduction ratio. According to the Bernoulli theorem, when a fluid flows through a constricted portion, a surface area A of the constricted portion, a flow rate Q, a pressure difference ΔP between before and after the constricted portion, and a fluid density ρ have the following relationship.

$$A=Q/\sqrt{(2\rho\Delta P)} \qquad (1)$$

Thus, the processing executed in the control unit 5 described below uses the Equation (1) to calculate the equivalent surface area A of the particulate filter 29 at a particular point in time when the calculation is made.

FIG. 3 is a functional block diagram for illustrating a flow of the processing for determining an exhaust gas flow rate QEXH. First, in step SI, a fresh air quantity QAC that flows into the cylinder and a fuel quantity QFTRQ that is injected into the cylinder are added together. Then, in step S2, the resulting sum is multiplied by the engine rotational speed NE to obtain the exhaust gas flow rate QEXH.

Figure 5:
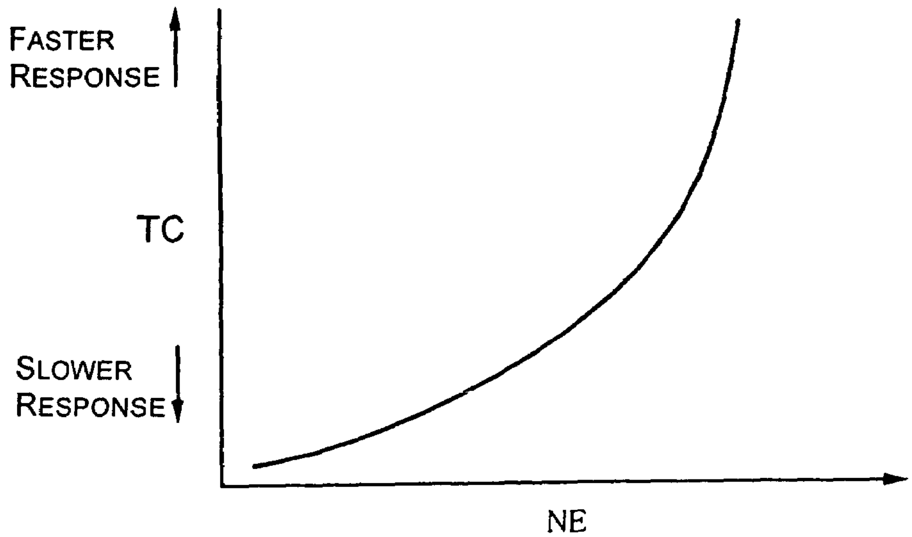
FIG. 5 is a characteristic diagram illustrating a characteristic curve of a filter constant used in steps S3 and S7 in the functional block diagram of FIG. 4.

FIG. 4 is a functional block diagram for illustrating a flow of the processing for determining a particulate matter accumulation amount SPMact. In step S3 of FIG. 4, the control unit 5 is configured and arranged to compute a weighted average of the consecutive values of the exhaust gas flow rate QEXH that are obtained as explained in FIG. 3. Then, the control unit 5 is configured and arranged to output the result as an exhaust gas flow rate QEXHD having an appropriate response characteristic. The filter constant (weighting coefficient) TC used in the weighted average computation in step S3 is a value found in step S4 using a prescribed map TTC_DPFLT based on the engine rotational speed NE. FIG. 5 illustrates a characteristic of the map TTC_DPFLT in which a response characteristic of the filter constant TC becomes slower when the engine is operating in a low rotational speed region, and faster when the engine is operating in a high rotational speed region.

The filter constant (weighting coefficient) TC determined in step S4 is also used in step S5 to compute a weighted average of consecutive values of an output value PF_D from the pressure difference sensor 32. The result is output as a pressure difference DP_DPF_FLT having an appropriate response characteristic.

In step S6, the control unit 5 is configured and arranged to determine a weighted average of consecutive values of an output value PF_Pre from the filter inlet temperature sensor 30. Also, in step S7, the control unit is configured and arranged to determine a weighted average of consecutive values of an output value PF_Pst from the filter outlet temperature sensor 31. In steps S6 and S7, the filter constant (weighting coefficient) TC used in the weighted average computations is set to a prescribed constant KTC_TEXH instead of using the prescribed map TTC_DPFLT shown in FIG. 5. Then, in step S8, the control unit 5 is configured and arranged to determine a temperature TMP_DPF of the particulate filter 29 as an average value of the inlet and outlet temperatures by adding the weighted average values of the output value PF_Pre and the output value PF-Pst together in step S8 and dividing the sum by a constant 2 in step S9. The temperature TMP_DPF is preferably expressed as an absolute temperature.

When the operating condition of the engine 1 changes abruptly (e.g., when the accelerator pedal depression amount increases or decreases substantially instantaneously), each parameter (i.e., the exhaust gas flow rate QEXH, the temperatures PF_Pre at the inlet and PF_post at the outlet of the particulate filter 29, and the pressure difference PF_D across the particulate filter 29) changes with a different response characteristic. More specifically, the pressure difference PF_Pre and the exhaust gas flow rate QEXH change comparatively quickly but the temperatures PF_Pre and PF_Pst change comparatively slowly. Consequently, there is a transient period during which a large error will be incurred if the particulate matter accumulation amount is estimated by reading in these detection values and using them without any adjustment to these detection values. Additionally, a step response of each parameter to a substantially instantaneous change in the engine operating condition varies depending on whether the engine rotational speed NE is high or low at the time of the change. Therefore, in this embodiment of the present invention, the appropriate filter constant TC is used in the weighted average computation of each detection value to prevent the precision of the particulate matter accumulation amount estimation from declining due to the variation in the response characteristics of the parameters. More particularly, in this embodiment of the present invention, the changes in the temperatures (i.e., PF_Pre and PF_Pst), which have the slower response characteristics than the exhaust gas flow rate QEXH and the pressure difference PF_D, are used as references for adjusting the response characteristics of the exhaust gas flow rate QEXH and the pressure difference PF_D. Also, the filter constant TC used in the weighted average computations of the exhaust gas flow rate QEXH and the pressure difference PF_D changes in accordance with the engine rotational speed NE. In other words, the weighted average computations of the detection values of the exhaust gas flow rate QEXH and the pressure difference PF_D are preferably performed in steps S3 and S5 so that the response characteristics of the exhaust gas flow rate QEXH and the pressure difference PF_D substantially match with the response characteristics of the temperatures PF_Pre and PF_Pst.

In step S13, the control unit 5 is configured and arranged to use a prescribed map TPEXH_MFLR to determine a pressure rise amount by which the pressure rises due to the air flow resistance of the muffler (not shown) based on the exhaust gas flow rate QEXHD. The pressure rise amount generally becomes larger as the exhaust gas flow rate QEXHD increases. In step S14, the control unit 5 is configured and arranged to add the pressure rise amount to the pressure difference DP_DPF_FLT in the exhaust passage 2 between before and after the particulate filter 29 to obtain an output value PEXH_DPFIN. The output value PEXH_DPFIN from step S14 is equivalent to the pressure difference due to the muffler and the particulate filter 29. In step S15, the control unit 5 is configured and arranged to add an atmospheric pressure pATM to the output value PEXH_DPFIN. Thus, the output of step S15 is equivalent to the exhaust gas pressure at the inlet of the particulate filter 29. In step S16, the control unit 5 is configured to multiply the output of step S15 (exhaust gas pressure at the inlet of the particulate filter 29) by a prescribed constant (shown in step S17) that corresponds to the gas constant R (0.350429). In step S18, the control unit 5 is configured and arranged to divide the output of step S16 by the temperature TMP_DPF (absolute temperature) of the particulate filter 29 obtained in steps S6 to S9. As a result, the output of step S18 is equivalent to a density ρ, i.e., a specific gravity ROUEXH, of the exhaust gas. In step S19, the control unit 5 is configured and arranged to multiply the specific gravity ROUEXH by a constant 2 (shown in step S20) and by the pressure difference DP_DPF_FLT in accordance with the above explained Equation (1).

In step S21, the control unit 5 is configured and arranged to determine a square root of the output value of step S19. The square root of the output value of step S19 is found using a prescribed map TROOT_VEXH for computational convenience. The result of step S21 is equivalent to the denominator of the expression on the right side of Equation (1), i.e., an exhaust gas flow speed VEXH. In step S22, the control unit 5 is configured and arranged to divide the exhaust gas flow rate QEXH by the exhaust gas flow speed VEXH, thereby obtaining a theoretical value of the surface area A of Equation (1). The theoretical value of the surface area A obtained in step S22 is set to a reference value for the equivalent surface area of the particulate filter 29. In this embodiment of the present invention, in order to increase the precision of the estimation of the particulate matter accumulation amount, the control unit 5 is configured and arranged to multiply the reference value of the equivalent surface area (i.e., the output of step S22) by an adjustment coefficient KADPF in step S23. More specifically, the equivalent surface area is adjusted in step S23 based on the exhaust gas flow rate and the temperature of the particulate filter 29 by using the adjustment coefficient KADPF.

Figure 6:
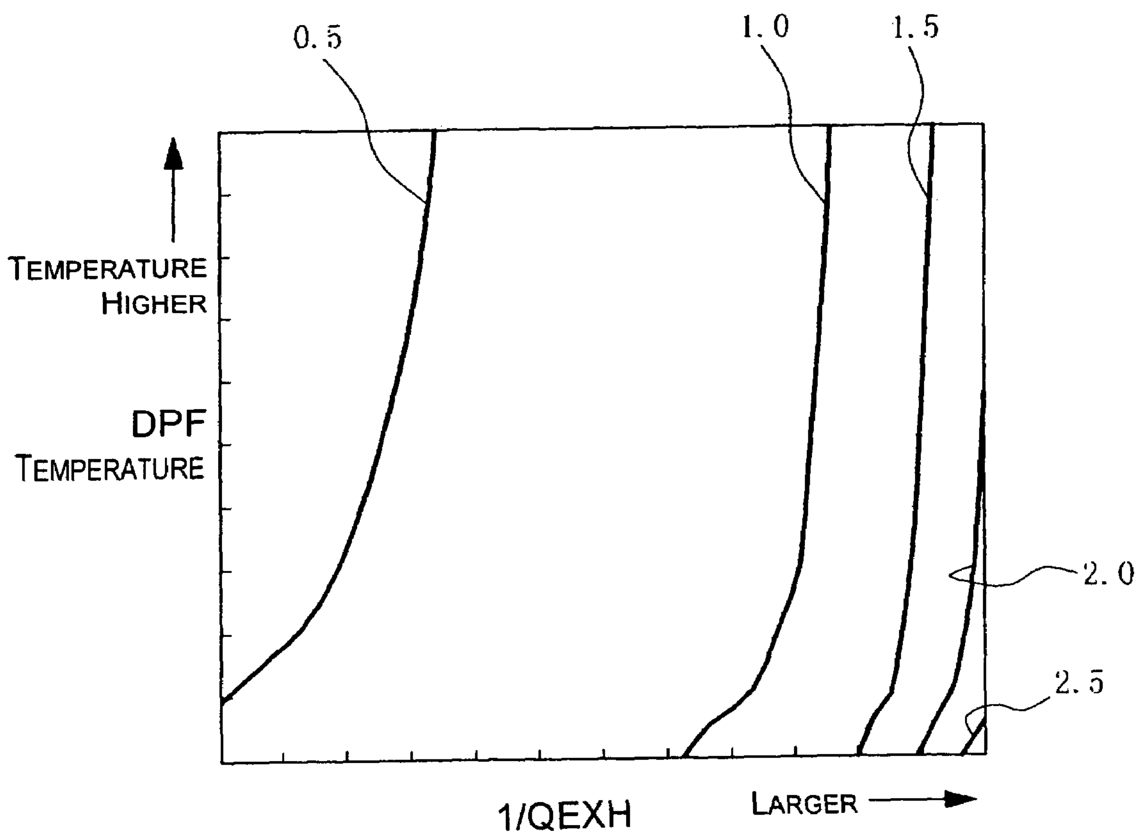
FIG. 6 is a characteristic diagram illustrating characteristic curves of a revision coefficient used in step S24 in the functional block diagram of FIG. 4.

The adjustment coefficient KADPF is obtained in step S24 using a map MAP_KADPF configured to use an inverse value of the exhaust gas flow rate QEXHD (shown in step S36) and the temperature TMP_DPF of the particulate filter 29 as inputs. The inverse of the exhaust gas flow rate QEXHD is found in step S36 by dividing the constant 1 by the exhaust gas flow rate QEXHD. FIG. 6 illustrates the characteristic of the map MAP_KADPF. As seen in FIG. 6, the adjustment coefficient KADPF is determined according to the inverse value of the exhaust gas flow rate QEXHD (1/QEXHD), and the adjustment coefficient KADPF varies over a range, for example, from 0.3 to 3.0. In FIG. 6, reference values (0.5, 1.0, 1.5, 2.0 and 2.5) are shown in solid lines, and an interpolated value is calculated based on those two adjacent reference values in an area between the two adjacent reference values. The filter passage usage efficiency of the particulate filter 29 changes (increases or decreases) as the exhaust gas flow rate, i.e., exhaust gas pressure, changes. Therefore, the adjustment coefficient KADPF is set to have the characteristic shown in FIG. 6 to counteract the effect of the change in the filter passage usage efficiency of the particulate filter 29. Moreover, the bulk density of the particulate filter 29 increases as the temperature of the particulate filter 29 increases, which causes the surface areas of the very narrow passages of the particulate filter 29 to become physically smaller. The adjustment coefficient KADPF is designed to counteract the effects of the passages of the particulate filter 29 being smaller. Thus, although the change in the adjustment coefficient KADPF with respect to the temperature TMP_DPF is comparatively small as seen in FIG. 6, the adjustment coefficient KADPF generally becomes smaller as the temperature TMP_DPF increases. Accordingly, the equivalent surface area of the particulate filter 29 can be estimated with better precision by multiplying the reference value of the equivalent surface area by the adjustment coefficient KADPF in step S23.

In step S25, the control unit 5 is configured to compute a weighted average of the values of the equivalent surface area obtained in step S23 and output the result as an equivalent surface area ADPFD of the particulate filter 29.

Figure 7:
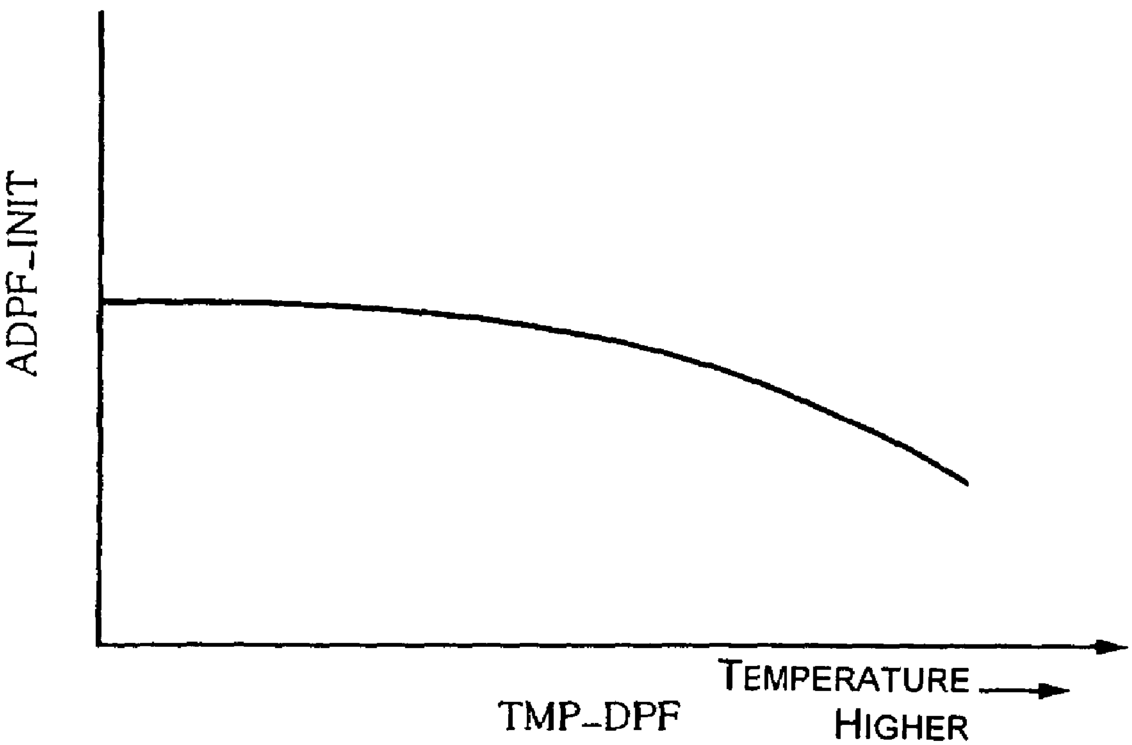
FIG. 7 is a characteristic diagram illustrating a characteristic curve of an equivalent surface area used in step S27 in the functional block diagram of FIG. 4.

In step S27, the control unit 5 is configured and arranged to find an initial equivalent surface area ADPF_INIT of the particulate filter 29, which is an equivalent surface area for a hypothetical case in which absolutely no exhaust particulate matter are accumulated in the particulate filter 29. As explained above, the bulk density and, thus, the passage surface area of the particulate filter 29 changes as the temperature of the particulate filter 29 changes. Therefore, in this embodiment of the present invention, the control unit 5 is configured and arranged to adjust an equivalent surface area based on the temperature TMP_DPF by using a prescribed map TBL_ADPF_INIT to obtain the initial equivalent surface area ADPF_INIT. FIG. 7 illustrates the characteristic of the prescribed map TBL_ADPF_INIT. As seen in FIG. 7, the initial equivalent surface area ADPF_INIT is substantially constant when the temperature is low, and decreases slightly when the temperature is high.

In step S28, the control unit 5 is configured and arranged to divide the equivalent surface area ADPFD obtained in step S25 by the initial equivalent surface area ADPF_INIT obtained in S27 to determine a passage surface area reduction ratio RTO_ADPF, i.e., a ratio of clogging ("clogging ratio") caused by the exhaust particulate matter accumulated in the particulate filter 29. In step S29, the control unit 5 is configured and arranged to refer to a prescribed map Tb1_SPMact to determine the particulate matter accumulation amount (weight) SPMact based on the clogging ratio RTO_ADPF. The prescribed map Tb1_SPMact is preferably set to follow a preset characteristic of the particulate matter accumulation amount SPMact with respect to the clogging ratio RTO_ADPF.

Moreover, in step S33, the control unit 5 is configured and arranged to determine a pressure rise amount resulting from an air flow resistance of the catalyst devices (i.e., the NOx trapping catalytic converter 28 and the oxidation catalytic converter 27) installed in the exhaust passage 2 upstream of the particulate filter 29 using a prescribed map TPEXH-_CATS based on the exhaust gas flow rate QEXHD. The pressure rise amount basically increases as the exhaust gas flow rate QEXHD increases. In step S34, the control unit 5 is configured and arranged to add the output value PEXH_DPFIN of step S14 to the pressure rise amount obtained in step S33 to obtain an output value PEXH_T-COUT. The output value PEXH_TCOUT from step S33 is equivalent to the turbine outlet pressure in the exhaust passage 2 on the outlet side of the exhaust turbine 22 upstream of the oxidation catalytic converter 27.

Referring now to a functional block diagram of FIG. 8, the control operations executed by the control unit 5 in order to determine the fuel injection quantity injected from the fuel injection nozzle 14 will be explained. Many of the functions described below are functions that can be executed using software processing.

Figure 8:
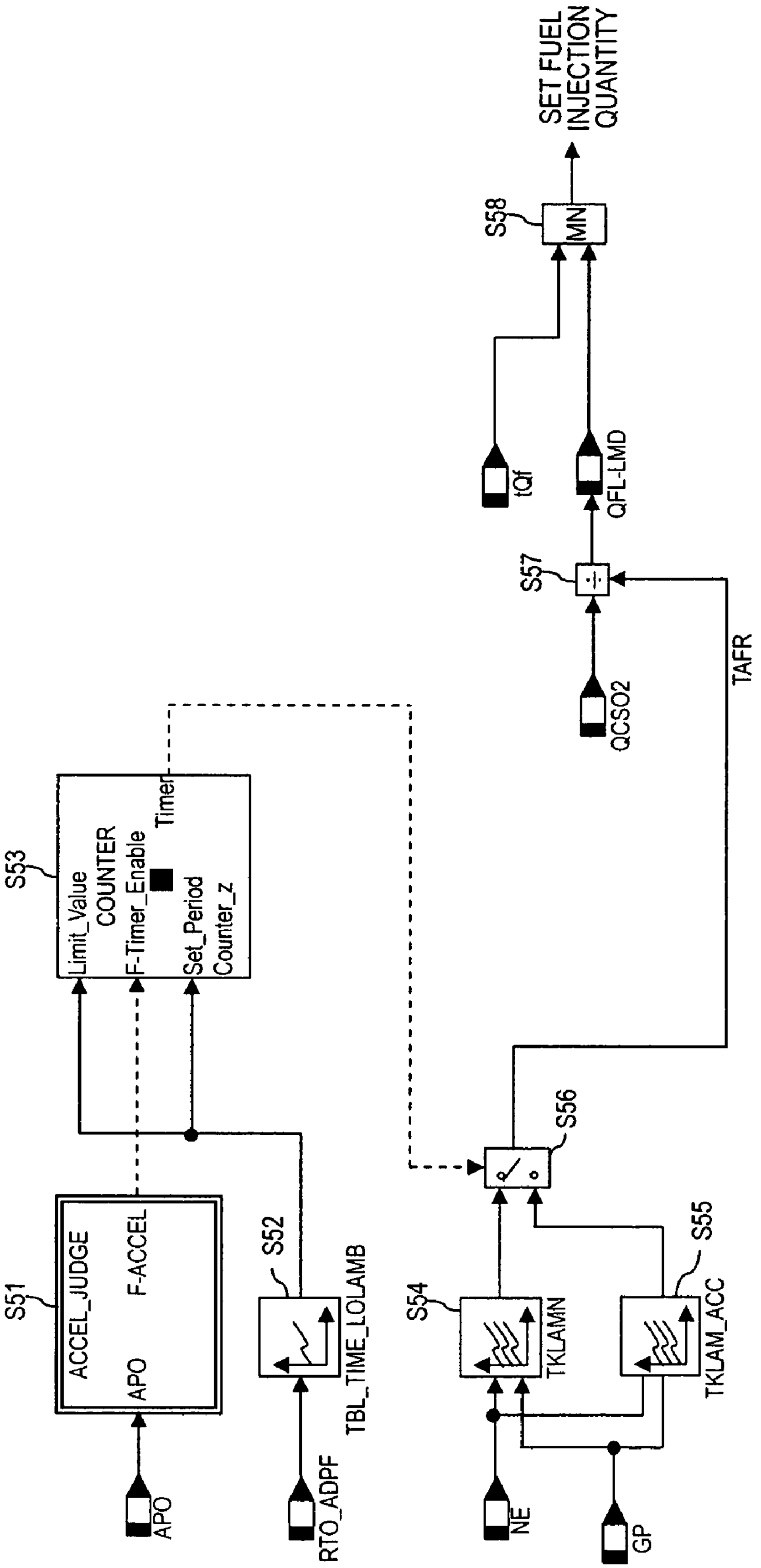
FIG. 8 is a functional block diagram illustrating a control processing executed in the diesel engine fuel injection control system in order to determine a fuel injection quantity in accordance with the one embodiment of the present invention.

In step S51 of FIG. 8, the control unit 5 is configured and arranged to determine whether the vehicle is in a full load operating state, e.g., whether the vehicle is accelerating rapidly, based on an accelerator signal APO issued from the accelerator pedal. Thus, step S51 preferably constitutes a rapid acceleration determination step.

In step S52, the control unit 5 is configured and arranged to use a map TBL_TIME_LOLAB to calculate a variable corresponding to the clogging ratio RTO_ADPF of the particulate filter 29 and send the variable to a counter of step S53.

The counter of step S53 is a timer configured and arranged to start counting with a prescribed interval when the rapid acceleration determining step (step S51) determines that the vehicle is accelerating rapidly. The counter of step S53 is further configured and arranged to stop counting when the count reaches a maximum count determined based on the variable received from step S52 when the counter started counting. In other words, the counter of step S53 measures an amount of time corresponding to the maximum count determined based on the variable corresponding to the clogging ratio RTO_ADPF. More specifically, the maximum count is set based on the variable such that the maximum count becomes smaller as the clogging ratio RTO_ADPF becomes larger. In other words, the larger the particulate matter accumulation amount (weight) SPMact in the particulate filter 29 is, the shorter the operating time of the counter of step S53 becomes.

Figure 9:
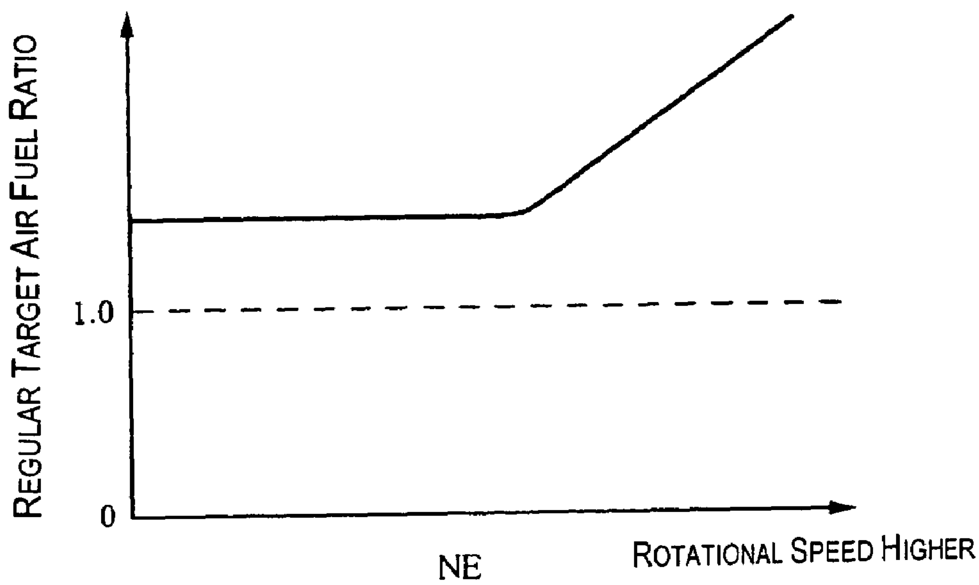
FIG. 9 is a characteristic diagram illustrating a characteristic curve of a regular target air fuel ratio in accordance with the one embodiment of the present invention.

In step S54, based on the engine rotational speed NE and the current gear position information GP of the transmission, the control unit 5 is configured and arranged to use a map TKLAMN to calculate a regular target air fuel ratio that is set to an air fuel ratio with which smoke will not be discharged from the combustion chamber 19. FIG. 9 illustrates the general characteristic of the map TKLAMN used in step S54. As seen in FIG. 9, the regular target air fuel ratio is fixed at a prescribed lean value (e.g., approximately 1.3 to approximately 1.4) when the engine 1 is operating at a low rotational speed and increases to a leaner value proportionally to the engine rotational speed NE when the engine 1 is operating at a medium to high rotational speed.

Figure 10:
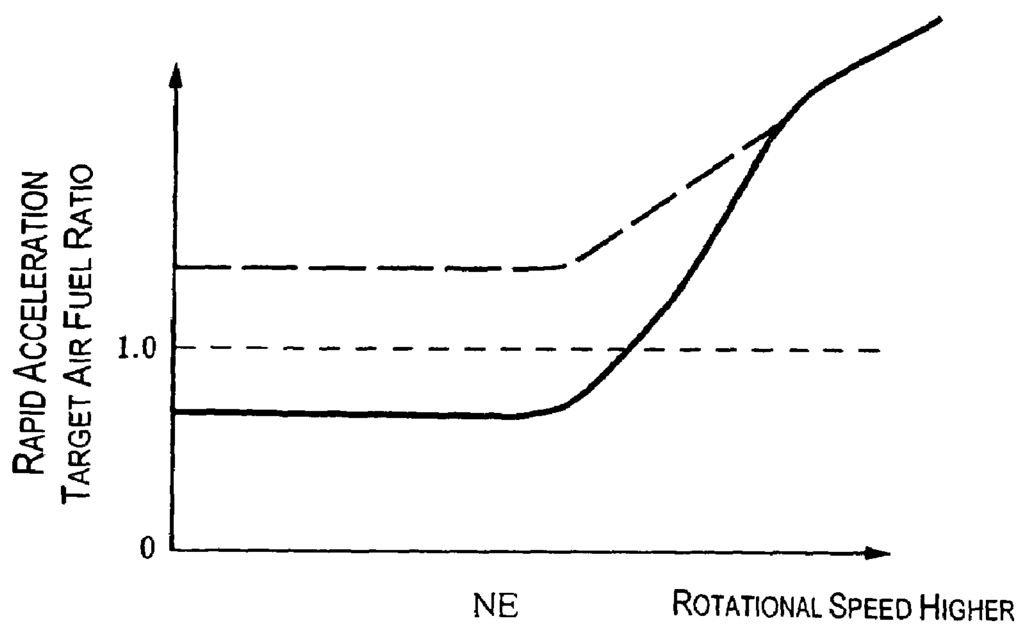
FIG. 10 is a characteristic diagram illustrating a characteristic curve of a rapid acceleration target air fuel ratio in accordance with the one embodiment of the present invention.

In step S55, based on the engine rotational speed NE and the current gear position information GP of the transmission, the control unit 5 is configured to use a map TKLAM_ACC to calculate the rapid acceleration target air fuel ratio that is used when the vehicle is operating in a full load condition, e.g., when the vehicle is accelerating rapidly. FIG. 10 illustrates the general characteristic of the map TKLAM_ACC used in step S55. As seen in FIG. 10, the rapid acceleration target air fuel ratio is preferably fixed at a prescribed lean value (e.g., approximately 0.9 to approximately 1.0) when the engine 1 is operating at a low rotational speed and increases to a leaner values proportionally to the engine rotational speed NE when the engine 1 is operating at a medium to high rotational speed. The broken line in FIG. 10 is provided for comparison with the characteristic of the regular target air fuel ratio shown in FIG. 9. As shown in FIG. 10, the rapid acceleration target air fuel ratio is preferably set equal to the regular target air fuel ratio in the high engine rotational speed regions.

Then, a switching unit of step S56 is configured and arranged to select and output one of the regular target air fuel ratio and the rapid acceleration target air fuel ratio as a target air fuel ratio TAFR based on an output from the counter of step S53. More specifically, when the counter of step S53 is stopped, i.e., when the counter of step S53 is not counting, the switching unit of step S56 is configured and arranged to output the regular target air fuel ratio calculated in step S54 as the target air fuel ratio TAFR. On the other hand, when the counter of step S53 is running, i.e., when the counter of step S53 is counting, the switching unit of step S56 is configured and arranged to output the rapid acceleration target air fuel ratio calculated in step S55 as the target air fuel ratio TAFR. Therefore, when the control unit 5 determines that the vehicle is rapidly accelerating, the counter of step S53 is configured and arranged to count for a prescribed period of time based on the particulate matter accumulation amount (weight) SPMact in the particulate filter 29, and the switching unit of step S56 is configured and arranged to output the rapid acceleration target air fuel ratio as the target air fuel ratio TAFR for the prescribed period of time.

In step S57, the control unit 5 is configured and arranged to calculate an air fuel ratio request maximum fuel injection quantity QFL_LMD, which is a fuel injection quantity required to obtain the target air fuel ratio TAFR. More specifically, the air fuel ratio request maximum fuel injection quantity QFL_LMD is calculated by dividing a cylinder fresh air quantity QCSO2 by the target air fuel ratio TAFR outputted from the switching unit of step S53. The cylinder fresh air quantity QCSO2 is an actual quantity of fresh air inside the combustion chamber 19 including the oxygen in the EGR, and calculated using the following Equation (2).

$$QCSO2 = Qac + [(Qac \times MEGR)/100] \times [(\lambda - 1)/\lambda] \quad (2)$$

In the Equation (2), Qac is a fresh air quantity detected by the air flow meter 35, MEGR is the EGR ratio, and $\lambda$ is a current exhaust gas air fuel ratio detected by the air fuel ratio sensor 17.

In step S58, the control unit 5 is configured and arranged to compare the air fuel ratio request maximum fuel injection quantity QFL_LMD to an accelerator requested fuel injection quantity tQf. The accelerator requested fuel injection quantity is determined based on an accelerator request issued by the driver (e.g., an accelerator depression amount). The control unit is configured and arranged to set (output) the smaller of the air fuel ratio request maximum fuel injection quantity QFL_LMD and the accelerator requested fuel injection quantity tQf as a fuel injection quantity. Then the control unit 5 is configured and arranged to control the fuel injection nozzle 14 to inject the fuel injection quantity set in step S58.

Accordingly, when the vehicle is accelerating rapidly, the air fuel ratio request maximum fuel injection quantity QFL_LMD is calculated based on the rapid acceleration target air fuel ratio. Consequently, when the engine 1 is operating at a low rotational speed and the vehicle is rapidly accelerated (full load operating condition), the fuel can be injected such that an air fuel ratio close to the stoichiometric air fuel ratio is achieved. Therefore, the torque performance and acceleration performance can be improved. Additionally, since the engine 1 of this embodiment is a so-called low compression ratio engine as described above, the engine 1 discharges almost no smoke from the combustion chamber 19 (cylinder) even though the fuel is injected to achieve an air fuel ratio close to the stoichiometric air fuel ratio (see FIG. 2). Moreover, even if smoke is discharged from the combustion chamber 19 (cylinder), the smoke can be captured almost completely by the particulate filter 29 provided in the exhaust passage 2 and the smoke is not discharged to the outside. Furthermore, even if smoke is discharged from the combustion chamber 19 (cylinder) as a result of injecting the fuel to achieve an air fuel ratio close to the stoichiometric air fuel ratio, there is substantially no change in the regeneration frequency of the particulate filter 29 because the frequency with which the engine enters a full load condition is very low.

Also, when the control unit 5 determines the vehicle is rapidly accelerating (i.e., the engine 1 is in a full load operating condition), the rapid acceleration target air fuel ratio is outputted as the target air fuel ratio TAFR for a prescribed period of time. More specifically, as described above, the prescribed period of time is determined based on the particulate matter accumulation amount (weight) SPMact in the particulate filter 29 and is set such that the larger the particulate matter accumulation amount (weight) SPMact in the particulate filter 29 is, the shorter the prescribed time period becomes. Consequently, excessive accumulation of the particulate matter inside the particulate filter 29 is prevented.

More specifically, the prescribed amount of time determined based on the particulate matter accumulation amount SPMact is a sufficient time for outputting the rapid acceleration target air fuel ratio as the target air fuel ratio TAFR because the engine 1 has a turbo supercharger 21 that performs supercharging. More specifically, when the rapid acceleration target air fuel ratio is outputted as the target air fuel ratio TAFR and the fuel is injected to achieve an air fuel ratio close to the stoichiometric air fuel ratio, the shift of the air fuel ratio to a richer value causes the exhaust gas temperature to rise. The extra heat energy of the higher exhaust gas temperature is recovered by the turbo supercharger 21, and thus, the turbo supercharger 21 is able to perform supercharging at a faster rate. Thus, it will not be necessary to inject the fuel with an air fuel ratio close to the stoichiometric air fuel ratio after the prescribed period of time has elapsed.

The embodiment explained above uses a so-called low compression ratio engine 1 in which low-temperature premixed combustion is executed by igniting the air fuel mixture after the fuel injection is finished. Moreover, in the low compression ratio engine 1, the combustion rate rises gradually by utilizing EGR during the period immediately after the ignition begins. As a result, the amount of smoke discharged from the cylinders (the combustion chamber 19) is relatively small. Thus, the effect of the smoke is relatively small even when the fuel is injected to achieve an air fuel ratio close to the stoichiometric air fuel ratio as described above.

The diesel engine fuel injection control system can also be configured such that the control unit 5 compares the rapid acceleration target air fuel ratio to the regular target air fuel ratio at the point in time when the target air fuel ratio TAFR is switched from the rapid acceleration target air fuel ratio to the regular target air fuel ratio (step S56 of FIG. 8). Then, if the rapid acceleration target air fuel ratio and regular target air fuel ratio calculated at that point in time are different, the target air fuel ratio TAFR does not change immediately to the regular target air fuel ratio after switching but, instead, is controlled so that the target air fuel ration TAFR gradually approaches the regular target air fuel ratio.

Accordingly, the diesel engine fuel injection control system in accordance with the present invention is configured to detect an engine operating condition based on the accelerator signal APO issued from the accelerator pedal, then the diesel engine fuel injection control system is further configured to compare the accelerator request fuel injection quantity tQf which is based on the accelerator request, e.g., an accelerator depression amount, to the air fuel ratio request fuel injection quantity QFL_LMD which is determined based on the target air fuel ratio TAFR based on the engine operating condition. Then, the diesel engine fuel injection control system is configured and arranged to select the smaller of the two injection quantities as a target fuel injection quantity. Moreover, the diesel engine fuel injection control system is configured such that when the engine 1 is operating in a rotational speed region with full load, the target air fuel ratio TAFR is corrected to a value in the vicinity of the air fuel ratio that provides the maximum torque. As a result, when the engine is operating in a low rotational speed region with full load, the fuel can be injected to achieve an air fuel ratio close to the stoichiometric air fuel ratio. Therefore, the torque performance and acceleration performance can be improved. Thus, in the embodiment explained above, the control unit 5 preferably constitutes an operating state detecting section and a target air fuel ratio correcting section.

Moreover, in the diesel engine fuel injection control system of the present invention, when the engine is operating in a low rotational speed region with full load, the target air fuel ratio TAFR is corrected to a value in the vicinity of the air fuel ratio that delivers the maximum torque for a prescribed period of time. Furthermore, the particulate matter accumulation amount SPMact in the particulate filter 29 is calculated based on the engine operating condition. Thus, the prescribed period of time is adjusted based on the particulate matter accumulation amount SPMact in the particulate filter 29. As a result, excessive accumulation of particulate matter in the particulate filter 29 can be prevented. Thus, the control unit 5 preferably constitutes an exhaust particulate matter accumulation calculating section.

Furthermore, as explained above, the engine 1 includes an exhaust gas recirculation system and is configured and arranged to perform low-temperature premixed combustion inside the combustion chamber 19.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately"

as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-284234. The entire disclosure of Japanese Patent Application No. 2003-284234 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine fuel injection control system comprising:

an operating condition detecting section configured and arranged to detect an operating condition of an engine;

a particulate filter configured and arranged in an exhaust passage of the engine to accumulate exhaust particulate matter discharged from the engine;

a fuel injection quantity determining section configured and arranged to compare an accelerator request fuel quantity corresponding to an accelerator depression amount with an air fuel ratio request fuel injection quantity determined based on a target air fuel ratio corresponding to the engine operating condition, and to select a smaller one of the accelerator request fuel quantity and the air fuel ratio request fuel injection quantity as a target fuel injection quantity; and a target air fuel ratio adjusting section configured and arranged to adjust the target air fuel ratio to a value substantially equal to an air fuel ratio that provides a maximum torque when the operating condition detecting section detects the engine is operating in a low rotational speed with a full-load condition.

2. The engine fuel injection control system as recited in claim 1, wherein the particulate filter is a diesel particulate filter for a diesel engine.

3. The engine fuel injection control system as recited in claim 1, wherein the target air fuel ratio adjusting section is further configured and arranged to adjust the target air fuel ratio to the value substantially equal to the air fuel ratio that provides the maximum torque for a prescribed period of time when the operating condition detecting section detects the engine is operating in the low rotational speed with the full-load condition.

4. The engine fuel injection control system as recited in claim 3, further comprising an exhaust particulate matter accumulation calculating section configured and arranged to estimate a particulate matter accumulation amount in the particulate filter based on the engine operating condition, the target air fuel ratio adjusting section is further configured to adjust the prescribed period of time based on the particulate matter accumulation amount.

5. The engine fuel injection control system as recited in claim 1, further comprising an exhaust gas recirculation system configured and arranged to perform an exhaust gas recirculation in the engine to achieve a low-temperature premix combustion.

6. The engine fuel injection control system as recited in claim 3, further comprising an exhaust gas recirculation system configured and arranged to perform an exhaust gas recirculation in the engine to achieve a low-temperature premix combustion.

7. The engine fuel injection control system as recited in claim 4, further comprising an exhaust gas recirculation system configured and arranged to perform an exhaust gas recirculation in the engine to achieve a low-temperature premix combustion.

8. The engine fuel injection control system as recited in claim 4, wherein the target air fuel ratio adjusting section is further configured to adjust the prescribed period of time such that the prescribed period of time becomes shorter as the particulate matter accumulation amount becomes larger.

9. A method of controlling a fuel injection quantity of an engine comprising:

detecting an operating condition of an engine;

providing a particulate filter in an exhaust passage of the engine to accumulate exhaust particulate matter discharged from the engine;

comparing an accelerator request fuel quantity corresponding to an accelerator depression amount with an air fuel ratio request fuel injection quantity determined based on a target air fuel ratio corresponding to the engine operating condition;

selecting a smaller one of the accelerator request fuel quantity and the air fuel ratio request fuel injection quantity as a target fuel injection quantity; and adjusting the target air fuel ratio to a value substantially equal to an air fuel ratio that provides a maximum torque when the engine is operating in a low rotational speed with a full-load condition.

10. The method as recited in claim 9, wherein the particulate filter is a diesel particulate filter for a diesel engine.

11. The method as recited in claim 9, wherein the adjusting of the target air fuel ratio is executed for a prescribed period of time when the engine is operating in the low rotational speed with the full-load condition.

12. The method as recited in claim 11, further comprising estimating a particulate matter accumulation amount in the particulate filter based on the engine operating condition; and adjusting the prescribed period of time based on the particulate matter accumulation amount.

13. The method as recited in claim 9, further comprising performing an exhaust gas recirculation in the engine to achieve a low-temperature premix combustion.

14. The method as recited in claim 12, wherein the adjusting of the prescribed period of time is executed such that the prescribed period of time becomes shorter as the particulate matter accumulation amount becomes larger.

15. An engine fuel injection control system comprising:

operating condition detecting means for detecting an operating condition of an engine;

particulate accumulating means for accumulating exhaust particulate matter contained in an exhaust gas discharged from the engine in an exhaust passage of the engine;

fuel injection quantity determining means for comparing an accelerator request fuel quantity corresponding to an accelerator depression amount with an air fuel ratio request fuel injection quantity determined based on a target air fuel ratio corresponding to the engine operating condition, and selecting a smaller one of the accelerator request fuel quantity and the air fuel ratio request fuel injection quantity as a target fuel injection quantity; and target air fuel ratio adjusting means for adjusting the target air fuel ratio to a value substantially equal to an air fuel ratio that provides a maximum torque when the operating condition detecting means detects the engine is operating in a low rotational speed with a full-load condition.

* * * * *